United States Patent [19]

Hartline

[11] 4,435,514

[45] Mar. 6, 1984

[54] CHROMIA MAGNESIA REFRACTORY

[75] Inventor: Stephen D. Hartline, Millbury, Mass.

[73] Assignee: Norton Company, Worcester, Mass.

[21] Appl. No.: 395,550

[22] Filed: Jul. 6, 1982

[51] Int. Cl.³ .................. C04B 35/04; C04B 35/12
[52] U.S. Cl. .............................................. 501/117
[58] Field of Search ......................................... 501/117

[56] References Cited

U.S. PATENT DOCUMENTS

| | | | |
|---|---|---|---|
| 2,271,362 | 1/1942 | Field | 501/117 |
| 2,537,012 | 1/1951 | Austin et al. | 501/117 |
| 4,366,256 | 12/1982 | North | 501/117 |

FOREIGN PATENT DOCUMENTS

| | | |
|---|---|---|
| 2478621 | 3/1981 | France . |
| 621736 | 8/1945 | United Kingdom . |

*Primary Examiner*—Mark Bell
*Attorney, Agent, or Firm*—Arthur A. Loiselle, Jr.

[57] ABSTRACT

A chromia-magnesia based refractory product made up of fused chromia-magnesia grains bonded by an in situ formed chromia-magnesia bond. The product is very dense and especially suitable when used to process molten materials which involve coal slag.

9 Claims, No Drawings

CHROMIA MAGNESIA REFRACTORY

TECHNICAL FIELD

This invention relates to chromia-magnesia refractory products. More specifically the invention is concerned with refractory articles composed of bonded grains of cofused chromia and magnesia.

BACKGROUND ART

Prior Art Statement

The following patents are representative of the most relevant prior art known to the Applicant at the time of filing the application.

| U.S. Pat. Nos. | | |
|---|---|---|
| 2,271,362 | January 27, 1942 | T. E. Field |
| FOREIGN PATENTS AND PUBLICATIONS | | |
| 621,736 | April 19, 1949 | United Kingdom |
| 2,478,621 | September 25, 1981 | France |

The Field patent, U.S. Pat. No. 2,271,362 is concerned with cast chrominum oxide based refractory products. Chromic oxide and up to 21% by weight of magnesium oxide in granular or powdered form are fused together and the molten fusion product is cast into the desired shape such as, for example, bricks, plates, and the like. Raw materials such as chrome green pigment type of chromic oxide, and magnesite can be employed. Field is relevant for its general teaching of chromia-magnesia refractories and the utilization of chrome green oxide and magnesite as starting materials.

U.K. Pat. No. 621,736 discloses another chromite based cast refractory composition which is particularly suitable for use in electric furnaces for melting alloy steels wherein the slag produced contains high amounts of iron oxide and alumina but low amounts of alkaline earth oxides such as magnesia and calcia. The fusion of $Cr_2O_3$, FeO, $Al_2O_3$ and $MgO \cdot Al_2O_3$ which is highly stable with respect to the particular type of slag involved.

The most relevant reference is French Patent Publication No. 2,478,621. Unlike the other two references, this reference is directed to chromia-magnesia based refractory products wherein these refractory products are not fabricated by fusion of a mixture of chromia and magnesia and casting of the molten mixture in appropriately shaped molds. The products of the French publication are sintered products. Chromia 71 to 82% by weight, and magnesia 16 to 28% by weight, are fused to produce a fused product that is at least 94% chromia-magnesia. This product, in the shape of an ingot for example, is then crushed to grains having a maximum size of 12 mm. The reference, for example, teaches using fused, crushed chromia-magnesia with a particle size distribution of 25% of 6–12 mm grains, 25% of 1.5–6 mm grains, 20% of 1.5 mm and finer, and 30% of 0.12 and finer, to form a green refractory shape in the conventional manner. The green shape is then fired at 1750° C. in a reducing atmosphere in order to sinter the afore described chromia-magnesia grain mixture. The resulting products varied in chromia-magnesia total content of from about 95% by weight to 99% by weight. The densities obtained by the reference ranged from 3.70 to a maximum of 3.77 $Mg/m^3$. According to the French reference, the composition of the fused, crushed chromia-magnesia grains is preferably rich on the MgO side of the $Cr_2O_3$-MgO spinel composition, i.e. 79.2% $Cr_2O_3$ and 20.8% MgO although as pointed out above, the reference discloses a broad range which includes compositions on the chromia rich side of the spinel formulation as well.

The present invention differs from both the Field and United Kingdom references in that these references are concerned solely with fused cast chromia-magnesia spinel refractory products, while the invention product is made up of grains of fused crushed chromia-magnesia bonded with an in-situ formed chromia or chromia-magnesia bond. The present invention differs from the French publication because the French reference teaches a product formed by sintering particles of chromia-magnesia spinel and not bonding said particles by a microcrystalline chromia-magnesia bond.

DISCLOSURE OF THE INVENTION

The primary advantages of the instant refractory product are its superior resistance to erosion by molten silica rich slags, particularly Western U.S. coal slag, and its low cost. The product's resistance to such corrosive slag is primarily a function of the nature and quantity of porosity, and the fact that chromia is one of the least soluble materials in molten siliceous materials.

The maximum amount of porosity is 30% with a preferred porosity content of 12% or less. The nature of the porosity is very fine and the pore path tortuous. As a result, the molten slag cannot penetrate significantly below the surface, thus chemical erosion is essentially confined to the surface thereby greatly extending the useful life of the refractory. This porosity characteristic is built into the product by the combination of a careful selection of a combination of particle sizes for the fused crushed chromia-magnesia grain, and the use of an in situ formed bond for those grains instead of merely sintering the fused crushed chromia-magnesia grains. The in situ formation of a bond from ultra fine particles of chromia or chromia and magnesia further reduces the already relatively low porosity resulting from the packing of the grains and in addition, isolates some of the remaining pores. Pore size is also significant; the present product has a maximum pore size of 8 microns or less with a preferred mean pore diameter of 1 to 2 microns.

While the foregoing may be accomplished with a variety of chromia-magnesia grain particle size combinations, a preferred combination has been found to be the following approximate size distribution; based on U.S. Standard Sieve Series:

| Grain Size (Microns) | Weight % |
|---|---|
| 4620–6848 | 15–25 |
| 1660–4620 | 11–21 |
| 710–1660 | 7–17 |
| 430–710 | 7–17 |
| 142–430 | 13–23 |
| 60–142 | 13–23 |
| Finer than 60 | 7–17 |

Another critical element of the invention is the fact that the fused chromia-magnesia grains are bonded and not sintered, and bonded with chromia or chromia-magnesia. The particle size of the chromia and magnesia in the raw batch mix should be very fine. The chromia or chromia source, preferably should have a particle size of 1 micron or finer; the magnesia is desirably 30 microns or finer in average particle size. As a rule of thumb, both materials should be at least fine enough to react readily at the firing temperature to which the raw batch mix will be subjected but not so fine as to be readily reactive with the environment at ambient conditions; particularly, the formation of $Mg(OH)_2$ should be avoided. When the raw batch mix contains preferably from 5 to 50% by weight of chromia or a mixture of chromia and magnesia, the finely particulate materials form a microcrystalline matrix of chromia in one case, and chromia-magnesia spinel in the other. When the spinel bonded embodiment is desired, the raw batch mix should preferably contain 3 to 5% by weight of magnesia and 16 to 25% by weight of chromia. In all cases, it is highly desirable that the chromia-magnesia ratio be on the chromia side of the chromia-magnesia spinel weight percent formula of approximately 79% chromia and 21% magnesia.

Further with respect to the fused crushed chromia-magnesia grain, the ultimate product results when it, or the raw batch mix, is composed of from 50 to 93% by weight of said grains and 7 to 50% by weight of the chromia or chromia-magnesia bond discussed above. The composition of the chromia-magnesia grains should be 75 to 90% by weight of chromia and 10 to 25% by weight of magnesia; the raw batch mix should be formulated to produce that chromia-magnesia relationship after firing or should actually contain those amounts of material. The most effective raw batch mixes should fall within the ranges of 50 to 93% by weight of the grain, 5 to 50% by weight of chromia and 0 to 12.5% by weight of magnesia.

It is not an absolute necessity that the grain and bond materials be highly pure, but the quality of the final product is directly related to the degree of impurity; silica is particularly undesirable. Therefore, the final product should be 92% by weight or more of chromia and magnesia and even more desirable still is product which is 95% or more chromia and magnesia.

The processing or fabrication method used to form the refractory product of the present invention is basically standarad procedure well known in the art and, therefore, forms no part of the present invention per se. The green refractory products can be shaped or placed by all of the usual techniques such as pressure molding, casting, tamping, ramming, and the like. The green product is then fired or heat treated in the conventional manner.

EXAMPLES OF THE PREFERRED EMBODIMENTS

Two raw batch mixes, A and B, were made from fused crushed chromia-magnesia grain which had a chemical analysis of about 80% by weight of $Cr_2O_3$ and 20% by weight of MgO which intentionally was slightly on the $Cr_2O_3$ rich side of the spinel $MgCr_2O_4$. The sizing of the fused grain was as follows:

| Grain Size (microns) | Weight % |
|---|---|
| 4620–6848 | 18.5 |
| 1660–4620 | 14.8 |
| 710–1660 | 11.1 |
| 430–710 | 11.1 |
| 142–430 | 16.7 |
| 60–142 | 16.7 |
| Finer than 60 | 11.1 |

This sizing allows for a high packing density.

The two raw batch mixes A and B were compounded by mixing two different amounts of the foregoing grain blend with a source of magnesia and a source of chromia, in the following weight % relationships:

|  | Mix A | Mix B |
|---|---|---|
| Fused $Cr_2O_3$—MgO grain | 80 | 70 |
| Fine $Cr_2O_3$ | 16.6 | 24.9 |
| Fine MgO | 3.4 | 5.1 |

To each of the foregoing was added 4% by weight of a 25% dextrin-water solution as a temporary binder. The source of $Cr_2O_3$ was a pigment grade material with an average particle size of 0.7 microns and a purity of at least 97%. The MgO was a calcined grade of magnesia which was 98% pure and had an average particle size of about 30 microns.

An ordinary steel mold with a rectangular cavity measuring $229 \times 57 \times 19$ mm was used to press rectangular test specimens from each of the two mixes; the pressing was accomplished at room temperature in a hydraulic press at a pressure of 6000 psi (41 MPa). The green bars or test specimens were separated into two groups. The first group was fired at about 1400° C. in the conventional manner, while the second group was similarly fired but at about 1600° C. Some of the fired bars from both mixes and both firing conditions were subjected to various physical tests with the following results:

|  | Mix A | | Mix B | |
|---|---|---|---|---|
| Fired bulk density $Mg/m^3$ | 3.80 | 3.81 | 3.82 | 3.84 |
| Modulus of Elasticity GPa | 88 | 94 | 101 | 104 |
| Modulus of Rupture | | | | |
| 20° C. MPa | 21.0 | 22.1 | 23.6 | 25.2 |
| 1250° C. MPa | 5.4 | 13.2 | 18.7 | 18.1 |

Additional test bars made from Mix B and fired at 1400° C. were studied for porosity, compressive creep, thermal expansion, and slag resistance properties. The bulk density was 3.87 $Mg/m^3$, the volume percent porosity was 12%, and the mean pore radius was about 1.1 microns. When subjected to a compressive load of 100 psi (0.7 MPa) the test bar deformed about 1.1%. The coefficient of thermal expansion up to 1500° C. was $8.6 \times 10^{-6}$/°C. Two different slag tests were run using Black Mesa coal slag with the following composition:

| Compound | Parts by Weight |
|---|---|
| $SiO_2$ | 49.8 |
| FeO | 8.9 |
| $Al_2O_3$ | 26.1 |
| MnO | 0.2 |
| CaO | 9.8 |
| MgO | 0.4 |
| $SO_3$ | 0.2 |
| $P_2O_5$ | 0.1 |
| $TiO_2$ | 0.9 |
| C | 3.0 |

The slag was an aggressive Western U.S. coal slag. The two slag tests differed in slag velocity and time but were both run at 1580° C. One test was a drip slag test similar to ASTM C768 where 500 g of slag was dripped onto the surface of the inclined sample over a period of about 6 hours. The other test was a rotating refractory sample in a crucible bath of slag. The drip slag test sample showed no erosion or corrosion as well as no obvious penetration. Rotating samples 25×25×229 mm were run at 6 RPM for 6 hours, 27 RPM for 12 hours, and finally 27 RPM for 48 hours. No corrosion or erosion was noted until the 48 hour test was run at 27 RPM and then only 0.24 mm loss in the thickness was noted. These slag test results were superior to all other "sintered" refractories which were tested including alumina and chromia-alumina commercial refractories.

What is claimed is:

1. A refractory product consisting essentially of grains of cofused chromia and magnesia, bonded with an in situ formed microcrystalline bond selected from the group consisting of chromia and chromia-magnesia.

2. The refractory product of claim 1 wherein said grains are present in an amount of from 50% to 93% by weight and said bond is present in an amount of from 7% to 50% by weight.

3. The refractory product of claim 2 wherein said grains contain from 75% to 90% by weight of chromia and 10% to 25% by weight of magnesia; and said bond contains from 75% to 100% by weight of chromia and 0% to 25% by weight of magnesia.

4. The refractory product of claim 3 wherein said grains have a particle size distribution such that the grains pack in such a manner as to produce a maximum of 30% pores by volume, the average size of said pores being 8 microns or less.

5. The refractory product of claim 4 wherein said grains have a particle size distribution by weight of the total content of said grains of 15 to 25% of grains having an average particle size of from about 6848 microns to 4620 microns, 11% to 21% of grains having an average particle size of from about 4620 microns to 1660 microns, 7% to 17% of grains having an average particle size of about 1660 microns to 710 microns, 7% to 17% of grains having an average particle size of from about 710 microns to 430 microns, 13% to 23% of grains having an average particle size of from about 430 microns to 142 microns, 13% to 23% of grains having an average particle size of from about 142 microns to 60 microns, and 7% to 17% of grains finer than 60 microns, said product having a density at least equal to 70% of theoretical density.

6. A raw batch refractory mix consisting essentially of grains of cofused chromia and magnesia, a finely particulate source of chromia, and a finely particulate source of magnesia.

7. The raw batch refractory mix of claim 6 wherein said grains are present in an amount of from 50% to 93% by weight, said source of chromia is present in an amount of from 5% to 50% by weight, and said source of magnesia is present in an amount of from 0% to 12.5% by weight.

8. The raw batch refractory mix of claim 6 wherein said grains have a particle size distribution by weight of the total content of said grains in said raw batch mix of 15% to 25% of grains having an average particle size of from about 6848 microns to 4620 microns, 11% to 21% of grains having an average particle size of from about 4620 microns to 1660 microns, 7% to 17% of grains having an average particle size of from about 719 microns to 439 microns 13% to 23% of grains having an average particle size of from about 142 microns to 60 microns, and 7% to 17% of grains finer than 60 microns.

9. The refractory raw batch mix of claim 7 wherein said source of chromia has an average particle size of about 1 micron or finer, and said source of magnesia has an average particle size of about 30 microns or finer.

* * * * *